United States Patent
Vetterick, Sr. et al.

(10) Patent No.: US 6,388,342 B1
(45) Date of Patent: May 14, 2002

(54) HYDRO ELECTRIC PLANT

(76) Inventors: Richard C. Vetterick, Sr., 2393 Brice Rd., Akron, OH (US) 44313; Richard C. Vetterick, Jr., Apt. 4, 106 Phila St., Saratoga Springs, NY (US) 12866

(*) Notice: Subject to any disclaimer, the term of this patent is extended or adjusted under 35 U.S.C. 154(b) by 0 days.

(21) Appl. No.: 09/362,527

(22) Filed: Jul. 28, 1999

(51) Int. Cl.$^7$ .................................................. F03B 13/10
(52) U.S. Cl. .......................... 290/53; 290/42; 60/398; 417/330
(58) Field of Search ...................... 290/53, 42; 60/398, 60/495, 496; 417/330, 331, 469

(56) References Cited

U.S. PATENT DOCUMENTS

| | | | | |
|---|---|---|---|---|
| 3,741,145 A | * | 6/1973 | Braddon | 114/125 |
| 3,835,654 A | * | 9/1974 | Lehanneur | 405/210 |
| 4,076,463 A | * | 2/1978 | Welczer | 417/331 |
| 4,111,610 A | * | 9/1978 | Brown | 417/332 |
| 4,125,346 A | * | 11/1978 | Pickle | 417/332 |
| 4,163,633 A | * | 8/1979 | Vriend | 417/332 |
| 4,206,601 A | * | 6/1980 | Eberle | 60/398 |
| 4,274,356 A | * | 6/1981 | Finsterwalder | 114/265 |
| 4,326,840 A | * | 4/1982 | Hicks et al. | 417/331 |
| 4,398,095 A | * | 8/1983 | Ono | 290/53 |
| 4,629,904 A | * | 12/1986 | Rojo, Jr. et al. | 290/52 |
| 4,754,157 A | * | 6/1988 | Windle | 290/53 |
| H611 H | * | 4/1989 | Peace | 114/264 |
| 5,186,822 A | * | 2/1993 | Tzong et al. | 210/122 |
| 5,217,324 A | * | 6/1993 | Freelain | 405/76 |
| 5,394,695 A | * | 3/1995 | Sieber | 60/398 |
| 5,411,377 A | * | 5/1995 | Houser et al. | 417/333 |
| 5,435,134 A | * | 7/1995 | Nielsen | 60/398 |
| 5,518,992 A | * | 5/1996 | Linkous | 504/151 |
| 5,747,416 A | * | 5/1998 | McArdle | 504/115 |
| 5,927,227 A | * | 7/1999 | Derby et al. | 114/264 |
| 5,975,865 A | * | 11/1999 | Manabe | 417/331 |

FOREIGN PATENT DOCUMENTS

| | | | |
|---|---|---|---|
| EP | 0421010 A1 | * | 4/1991 |
| FR | 2467997 | * | 10/1979 |
| FR | 2477237 | * | 2/1980 |
| GB | 2 027 815 | * | 2/1980 |

* cited by examiner

*Primary Examiner*—Joseph Waks
(74) *Attorney, Agent, or Firm*—Renner, Kenner, Greive, Bobak, Taylor & Weber

(57) ABSTRACT

An apparatus and method for converting renewable wave action energy to electrical energy that harnesses fluid wave power by employing a plurality of low-mass buoys floating on a fluid surface connected to low-volume pumps. The pumps transfer fluid from a source to an elevated storage tank. There, the water can be held in the tank as a reserve, when not being immediately used to generate electrical power. When there is a demand for electrical power, the reserve is released from the storage tank and flows, by gravity, through a hydro-electric generator creating an electrical current.

20 Claims, 9 Drawing Sheets

HYDRO ELECTRIC PLANT

TECHNICAL FIELD

The present invention relates in general to power production and more particularly, to a process and apparatus for producing electrical power in the form of an electric current. More specifically, the present invention relates to a wave action hydro-electric power plant and method of converting wave motion into electrical energy.

BACKGROUND OF THE INVENTION

The major source of energy utilized in the United States, and throughout the world is derived from thermo-electric power plants burning fossil fuel as the energy source. These plants depend on the earth's finite supply of fossil fuels. When burning these fuels, thermoelectric plants release undesirable gases into the atmosphere. Thus it is desirable to construct a power plant that uses a renewable energy source without producing harmful gases.

Wave energy provides a clean renewable energy source. The capture of wave energy has been the focus of many inventors since the middle of the $18^{th}$ century. A greater effort was expended in the 1970's as several European Governments made extensive funds available for research. Despite all of this effort, little progress has been made.

Common devices in the art are massive structures employing complex custom components. These structures convert the action of waves into electrical energy in a continuous process. This continuous energy production is dependent upon the wave conditions throughout the day. For example, calm ocean conditions will produce less energy than active ocean conditions. By using continuous energy production, the electrical energy is produced without regard to demand. The typical electrical demand is cyclical in nature, being much greater during the typical peak load hours of the day as opposed to the low load conditions experienced at night.

Thus, it is desirable to create a wave action hydroelectric power plant using simple stock components that decouples energy production from wave conditions. It is additionally desirable to create a wave action hydro-electric power plant that can produce electricity in response to electrical energy demand.

SUMMARY OF THE INVENTION

The present invention is directed to the capture and transformation often renewable wave energy into useable electrical power on a schedule to meet peak load periods. In this regard an object of this invention is to capture ocean wave energy and convert it to electrical power in a wave action hydroelectric plant. It is a further object of this invention to decouple the energy capture phase from the energy generation phase.

Certain of the objects of the present invention are attained by a wave action hydroelectric plant, comprising a plurality of wave action pumps; wherein the pumps are in fluid communication with a storage tank and a source; wherein the pumps draw fluid from the source; the storage tank has a tank inlet for receiving fluid from the pumps and a tank outlet, wherein the outlet is selectively in fluid communication with a hydroelectric generator; the hydroelectric generator receives fluid from the storage tank outlet; the fluid passes through the hydro-electric generator to an exit, wherein passage of the fluid through the hydroelectric generator generates an electric current.

Other aspects of the invention are attained by a method for converting renewable wave action energy to electrical energy, comprising the steps of a) using a rising and falling motion of a wave to pump water from a source to a storage tank; b) storing the water in the storage tank until there is a demand for electric power; c) driving a hydroelectric generator by releasing the water from the storage tank at a height above the generator, said generator producing an electric current.

Yet other aspects of the invention are achieved by a method for converting renewable wave action energy into electrical energy, comprising the steps of: harnessing fluid wave power by employing a plurality of low-mass buoys floating on a fluid surface connected to low-volume pumps by a connecting rod or cable, wherein the buoy travels in a generally vertical direction corresponding to a wave's rise and fall, wherein on an upward stroke the pumps transport water to a storage tank; storing the water in the storage tank until there is a demand for electrical power; upon demand for electric power, driving a hydro-electric generator by releasing the water from the storage tank at a height above the generator, said generator producing electric current.

Still a further aspect of the present invention is to provide a wave action hydro-electric plant comprising at least one wave action pump having a buoy floating on a fluid surface; a positive displacement pump having a casing restrained vertically by an anchor, wherein the casing defines a cavity; a piston disposed within the cavity, said piston and buoy being connected by a connecting rod or cable, said buoy, piston, and connecting rod or cable having a mass, such that, a rising surface of a wave will lift the buoy, connecting rod or cable, and piston; and wherein the buoy, connecting rod or cable, and piston descend with a falling surface of the wave by gravity or spring forces; said wave action pump having a pump inlet and a pump outlet, wherein the pump draws fluid from a source through the pump inlet as the piston falls, and wherein the pump transports the fluid through the pump outlet to a storage tank as the piston rises; said storage tank having a tank inlet and a tank outlet, wherein the tank inlet receives fluid from the pumps, and the tank outlet is in selective fluid communication with a hydroelectric generator, such that when the tank outlet is in a closed position the fluid is stored in the storage tank, and when the tank outlet is in an opened position the fluid in the storage tank flows into the hydro-electric generator; said hydro-electric generator converting energy from the flowing fluid into an electric current, wherein the electric current is transported from the generator by a power line to a consumer.

DETAILED DESCRIPTION OF THE PREFERRED EMBODIMENT

Figure 1:
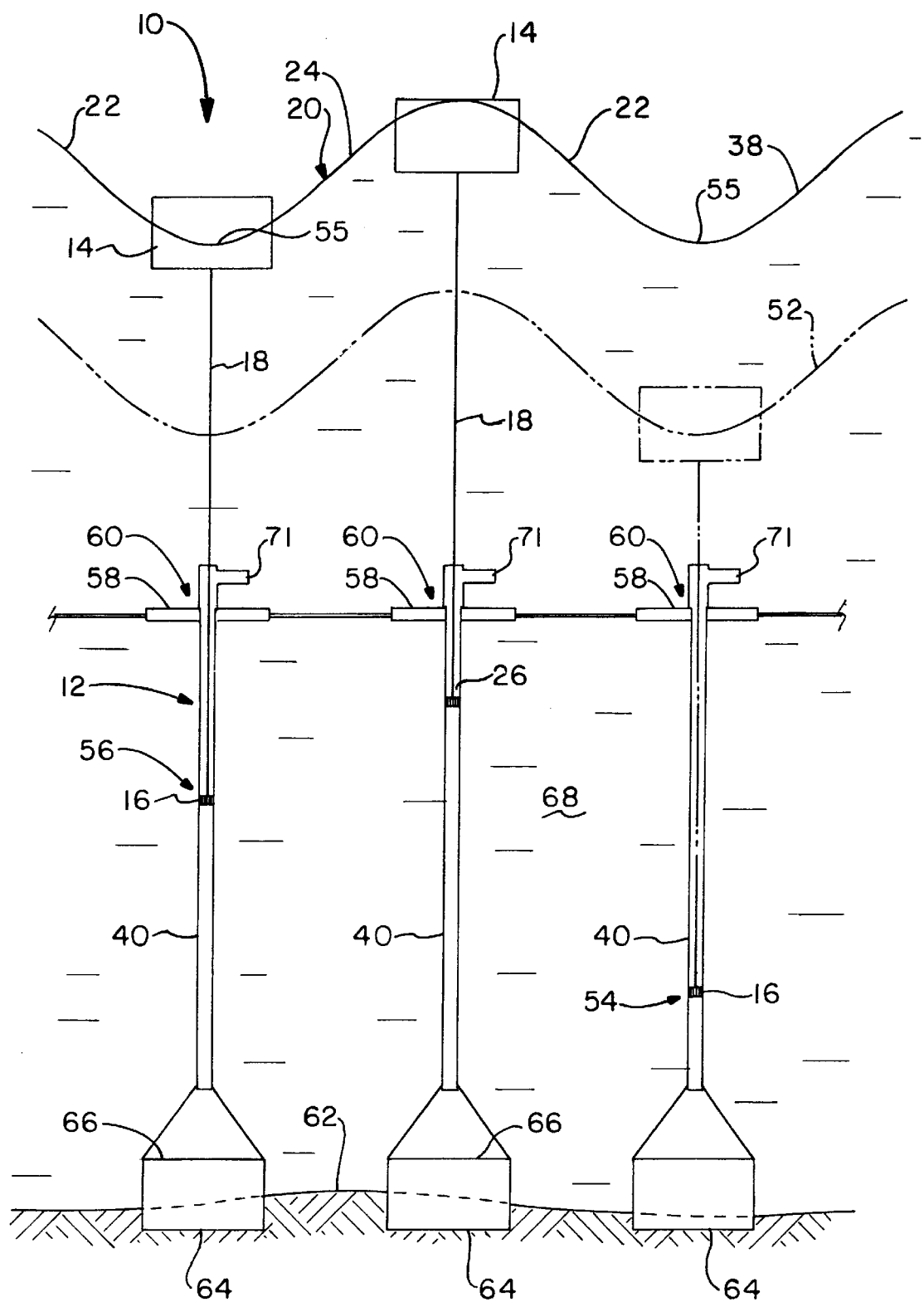
FIG. 1 schematically illustrates via an elevational view a series of wave-action pumps in accordance with the present invention.

One representative form of a wave action hydro-electric power plant embodying the concepts of the present invention is designated generally by the numeral 1 on the accompanying drawings. It has been found that an efficient wave action hydro-electric power plant 1 for capturing wave power can be constructed of simple components. A plurality of wave action pumps can harness wave power to pump fluid to a higher elevation. Storing this fluid in a storage tank decouples the wave power capture phase from an electrical energy generation phase. The energy generation phase occurs when the fluid is released from the storage reservoir, and flows through a hydroelectric generator, by gravity, to produce electricity.

The present invention employs a modular design, and can be scaled up by the addition of numerous full sized components as deemed appropriate. A plurality of wave action pump apparatus 10 form a pump farm 34 or pumping field. The pump farm transports fluid to a storage reservoir 72. The fluid is selectively released from the reservoir to flow through a hydroelectric generator 30. By increasing or decreasing the size of the pumping field 34, storage reservoir, and hydroelectric generator 30, one can adjust the amount of wave power captured and electricity generated. In addition, varying the size of these components controls the cost of construction and the performance characteristics.

In the preferred embodiment the wave action hydro-electric plant 1 utilizes renewable ocean wave energy. It can be appreciated that other wave producing bodies of fluid may be used. The present invention uses numerous small wave activated pumps 10 to move finite quantities of water to a higher elevation on a continual basis. Once accumulated in storage tanks 72 at some higher elevation, the water 26 is available to be drained back by gravity to the ocean through a hydroelectric generator 30.

The wave action pump apparatus 10 utilize buoyancy to power positive displacement pump apparatus 12 moving fluid 26 to a higher elevation and a higher potential energy level. The rise and fall of the waves provides the energy to power the pump. A representative arrangement is shown in FIG. 1. A float or buoy 55 is mechanically tied by a connecting rod or cable 18 to a positive displacement pump piston 16. The buoy 14 and pump 12 are fixed in a geographical location such that the buoy 14 and the connecting rod or cable 18 move essentially in a vertical direction. As the waves 20 pass by the buoy 14, the elevation of the wave surface 38 rises. With reference to FIG. 1, the waves shown moving from left to right, this rising surface 22 causes the buoy 14 to rise also. Since the buoy 14 is tied by the connecting rod or cable 18 to the positive displacement pump piston 16, the rise of the buoy 14 with the wave 20 gives rise to the power stroke of piston 16. As the wave 20 passes by, the buoy 14 drops by gravity along falling surface 24 and the positive displacement piston 16 is reset to the starting position of the next power stroke. After repeated cycles of the wave action power strokes, a sufficient amount of fluid 26 from source 68 is hoisted to a sufficient height to provide a reserve 28, FIG. 3, for eventual usage as feedstock for a hydroelectric generator 30. The storage facility 32 may be one or more tanks atop a tower at sea, not unlike a drilling platform used for oil well drilling and petroleum storage/transfer. Or, the wave action pump farm 34 may be located adjacent to terrain where a storage pond could be located at a higher elevation on shore. As the electrical load requires, the fluid 26 is released to flow down through hydro-electric generator 30 to generate electrical power.

Figure 2:
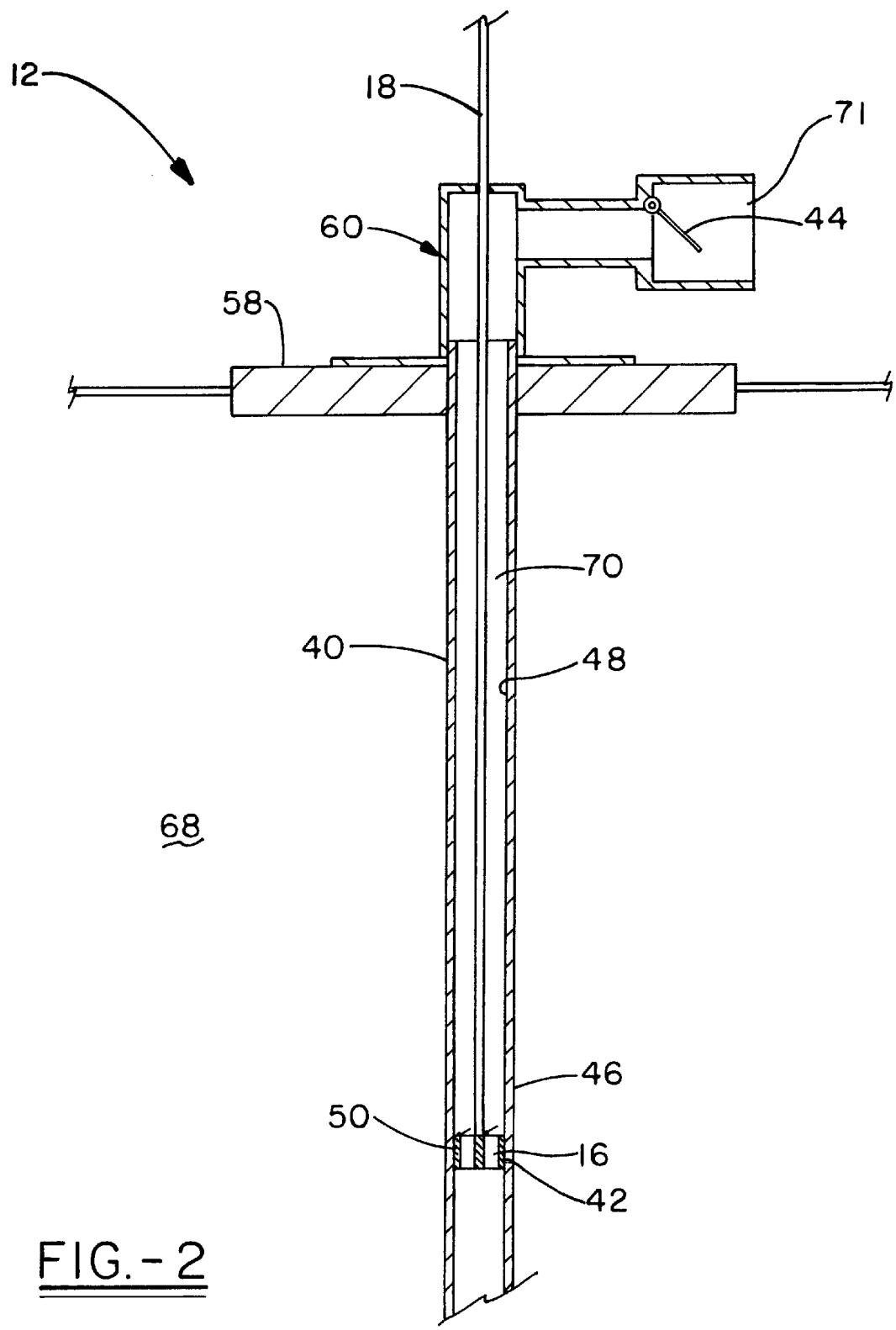
FIG. 2 is an enlarged elevational view, in section, of a pump shown in FIG. 1.

With reference to FIG. 1, the wave action pump apparatus 10 includes a positive displacement pump 12 mechanically tied to a buoy 14. As best shown in FIG. 2, the positive displacement pump 12 comprises casing 40, piston 16, outlet check valve 44, and inlet check valve 46 disposed on the piston 16. The inside surface 48 of the casing 40 is machined smooth for sealing against the piston circumference 50, typical of a positive displacement pump. Moreover, it is preferred that the length of the casing 40 is uniquely longer than the power stroke. As demonstrated in FIG. 1, this allows for variations in the distance between the buoy 14 and the vertically fixed casing 40 caused by tide variations. As best shown in FIG. 1, at low tide 52, indicated by a dashed line, the piston 16 assumes a low tide start position 54 with the buoy 14 at the trough 55 of the wave 20. With continued reference to FIG. 1, it can be seen that this position varies from the piston's high tide, high wave crest position 56. This variance in height is essentially equal to the tide variations plus the maximum wave action height expected for that particular region, plus a safety factor. A flotation collar 58 affixed to the top end 60 of the casing 40 maintains the casing's relative position upwardly as well as its horizontal spacing. The casing 40 is fixed vertically with the ocean floor 62 by an anchor 64. It must be understood that any structure or mass that will restrain the casing 40 may be used as the anchor 64. For example, in systems incorporating submerged tanks, the submerged tank may anchor the casing 40. By restraining the casing 40 in essentially a fixed position by anchor 64 and allowing the piston 16 to rise and fall with the wave motion, relative pumping motion is created between casing 40 and piston 16.

Figure 4:
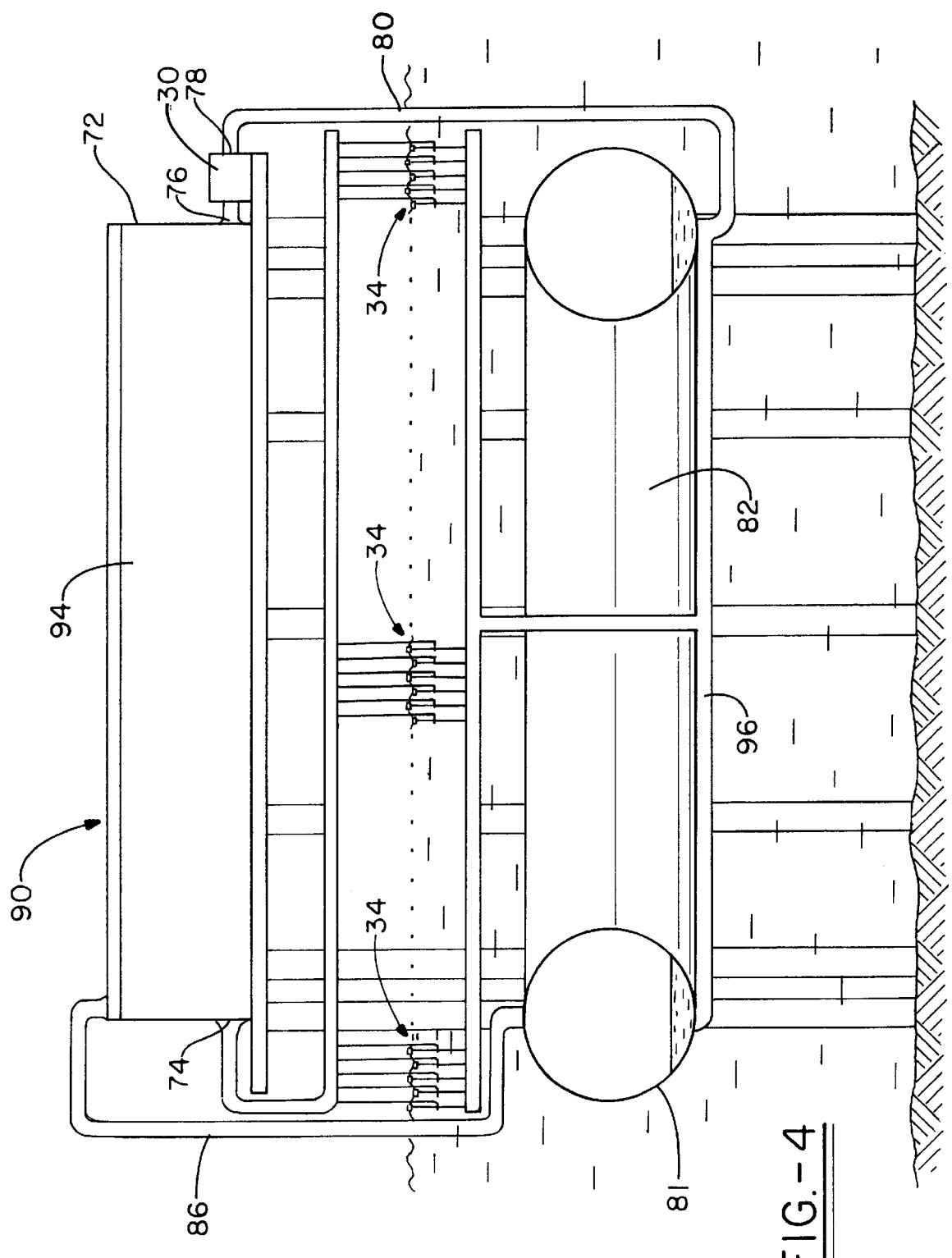

As best seen in FIG. 2, this motion provides the engine for the wave action pump's piston 16. The piston 16 has at least one inlet check valve 46 that opens as the piston 16 descends, allowing fluid 26, represented by arrows, from a source 68 to fill a cavity 70 formed within the pump casing 40. This source 68 can be any fluid supply including an ocean or lake in which the pump apparatus 10 is placed, or fluid stored in a vessel 82 (FIG. 4). Since the buoy 14 is connected to the piston 16, as the buoy rises the piston 16 also rises and the inlet check valves 46 close, FIG. 2A. This causes the fluid 26 within the cavity 70 to be driven through the cavity 70 to the outlet check valve 44. The outlet check valve 44 is opened by the force of the fluid 26 driven by the piston. The fluid 26 is discharged from the outlet check valve 44 and is carried to a reservoir via conventional fluidic piping for simplicity, the fluidic piping will be collectively referred to as a discharge 71.

Figure 3:
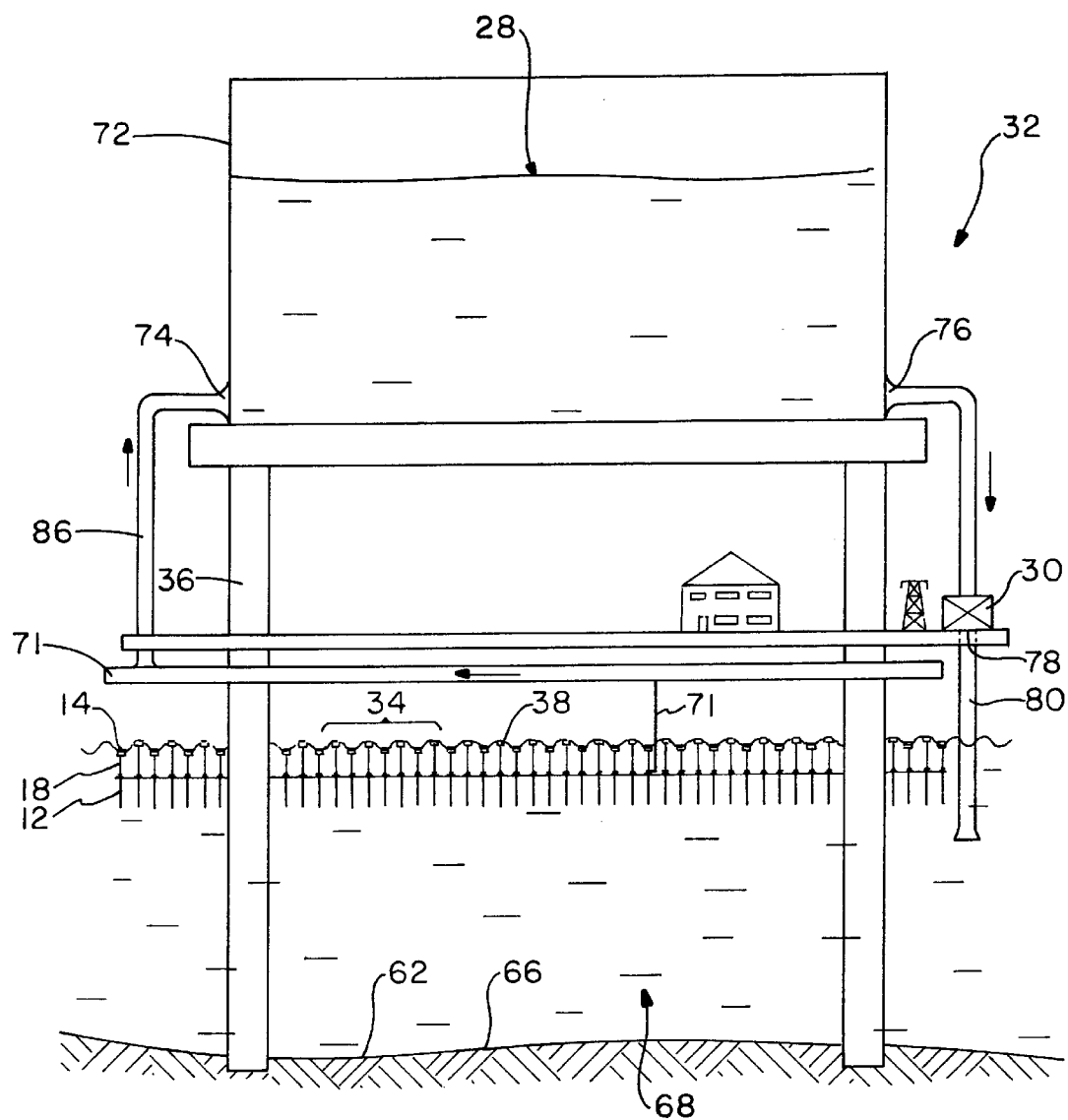
FIG. 3 schematically illustrates a wave-action hydroelectric plan employing the pumps of FIG. 1, FIG. 4 schematically illustrates a closed system as may be configured using wave-action pops.

As shown in FIG. 3, the energy reservoir is a storage tank 72 elevated above a hydroelectric generator 30. As shown, storage tank 72 is a conventional closed container, but, an open container can be used effectively. Although, an open container would beneficially collect additional water, from rain, that could be used for power generation, the open container would increase the likelihood of contaminants or debris being collected within the tank. These contaminants could be drawn from storage tank 72 into generator 30 and possibly degrade the plant's performance.

This tank 72 accumulates fluid 26 pumped from the wave action pump apparatus 10. The fluid 26 collected from the pumps 10 enters the storage tank 72 through a tank inlet 74.

The fluid 26 is held in the storage tank 72 until electrical demand requires its release. A tank outlet 76, or valve, selectively controls the release of the fluid 26. Upon release, the fluid 26 exits the storage tank 72 though the tank outlet 76, and, by force of gravity, is carried through the hydro-electric generator 30. In a process known in the hydro-electric generator art, the generator 30 converts the fluid flow into electrical current.

After the fluid 26 passes through the hydro-electric generator 30 it leaves the generator 30 via an exit 78 conventionally formed within the generator. The exiting fluid may be released freely or returned to the source 68 by a siphon line 80. When the source is a vessel 82, a closed system 90 (FIG. 4) is created by reclaiming the fluid 26 in the vessel 82. The fluid 26 is reclaimed by connecting the exit 78 to the source vessel 82.

In an ocean based plant, a closed system 90 could reduce the amount of clogging, corrosion, and wear associated with using sea water. The closed system 90 allows the fluid medium 26 to be filtered and chemically treated as it passes through the plant 1. It should be understood that any conventional filter or chemical feed system can be used, for example, chemical feed system delivering chlorine reduce bacteria and marine growth. Appropriate mechanisms would reduce operating problems including marine growth on internal surfaces of pipes and the tanks.

Figure 5:
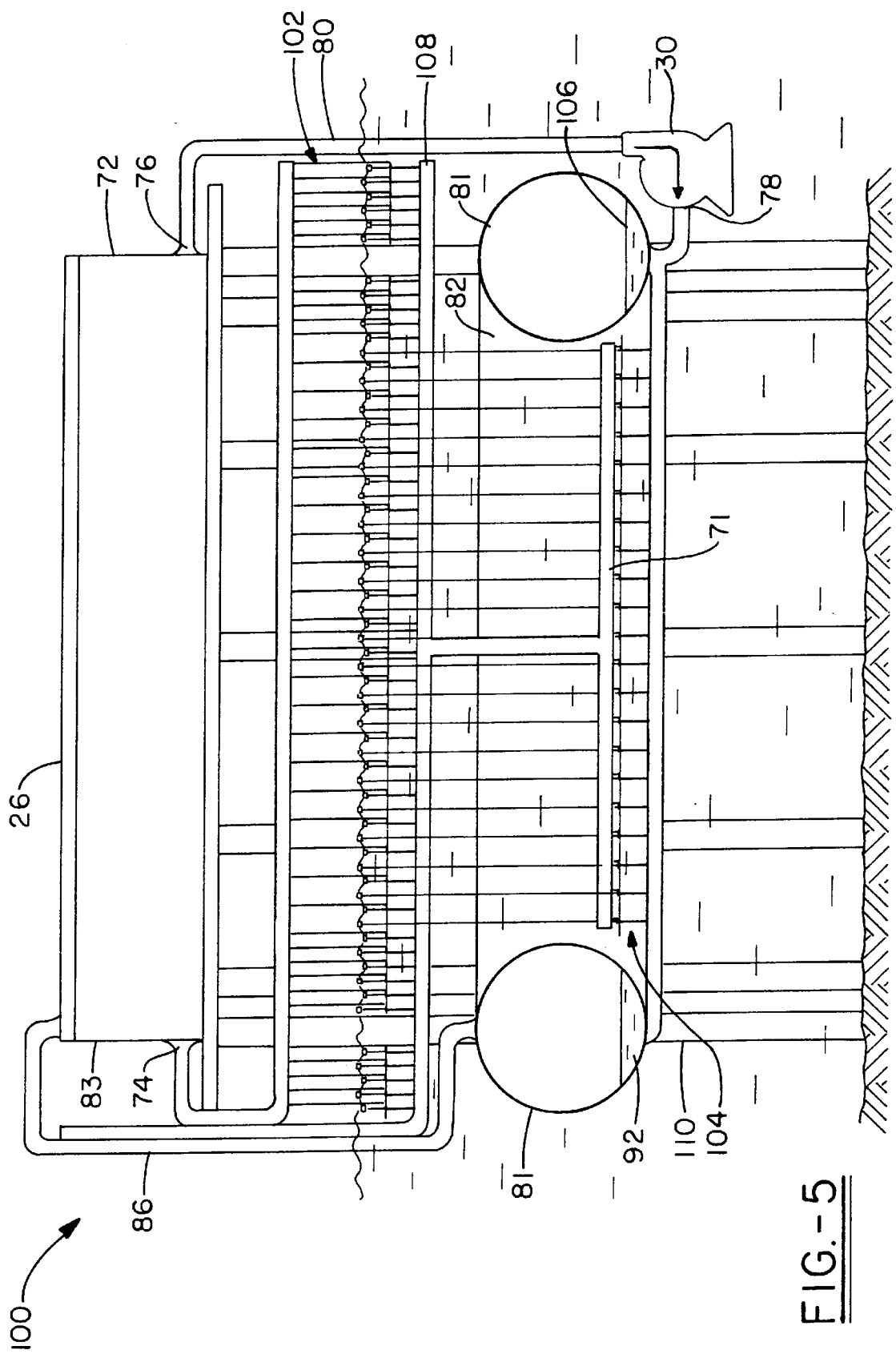
FIG. 5 schematically illustrates a two tier system following the system shown in FIG. 4.

As shown in FIG. 4, the closed system 90 uses a vessel 82 as a fluid source for the pump apparatus 10. In FIG. 4 the vessel 82 is a submerged tank. This tank, as shown, is donut-shaped, but, as can be appreciated, any shape can be used. As shown in FIG. 5, the submerged tank's circumference 81 exceeds the storage tank perimeter 83 to provide greater stability and maintain balancing forces. Internal baffling 84 is utilized to prevent sudden shifting of fluid within tank. Fluid 26 is pumped from the submerged tank 82 to the storage tank 72 by wave action pump apparatus 10. Upon release from the storage tank 72, the fluid 26 passes through the hydro-electric generator 30, emerging from the generator at exit 78 and is reclaimed in submerged tank 82.

In FIG. 5 submerged tank 82 and interstage surge line 108 are used to create a two tiered pumping system 100. If one is attempting to draw water from too great a depth, a single tier system has a tendency to cavitate. Cavitation occurs when too great a vacuum is created allowing the water to vaporize. This vaporization disrupts the hydraulic system by causing the pump to lose its prime. The two tiered system divides the drawing height into two stages such that one can obtain a higher draw without cavitation. As will be detailed below, the two tiered system 100 can reduce the cost of supporting the storage tank 72 by increasing its height and by reducing the size of the vessel and storage structures necessary to produce a given amount of power. To accomplish this, the two tiered system 100 uses two vessels, a submerged tank 82, and interstage surge line 108. The pump field 34 is divided into upper stage pumps 102 and lower stage pumps 104. The upper stage pumps 102, located above the submerged tank 82 are used to pump fluid 26 from an interstage surge line 108 to the storage tank 72. The lower stage pumps 104 pump reclaimed fluid from submerged tank 82 to the interstage surge line 108. By doing this, the volume and head developed by the wave action pump apparatus 10 is utilized more efficiently. The total power of the wave action pumps is the same, but the volume is halved, and the hydraulic head available for hydroelectric generation is essentially doubled. In addition, halving the volume of the working fluid and doubling height reduces the size of the requisite support structure and the size of the hydro-electric generator 30. In addition, the buoyancy of the submerged tank 82 can aid in supporting the weight of the overhead tank 72.

With reference to FIG. 4, closed system 90 could be pressurized. Higher pressures reduce fluid volatility and cavitation problems occurring at the wave action pump suction 96 and turbine exit 78 are avoided. In this scenario, the turbine can be placed above sea level, in contradiction to the system of FIG. 5, which is below sea level. The pressurized system also allows all of the pump apparatus 10 to pull fluid 26 from a lower reservoir or submerged tank 82 to an upper reservoir or tank 72. To keep the tanks at constant pressure and allow fluid to flow freely between the tanks, a vent line 86 connects the storage tank 72 to the submerged tank 82.

Figure 6:
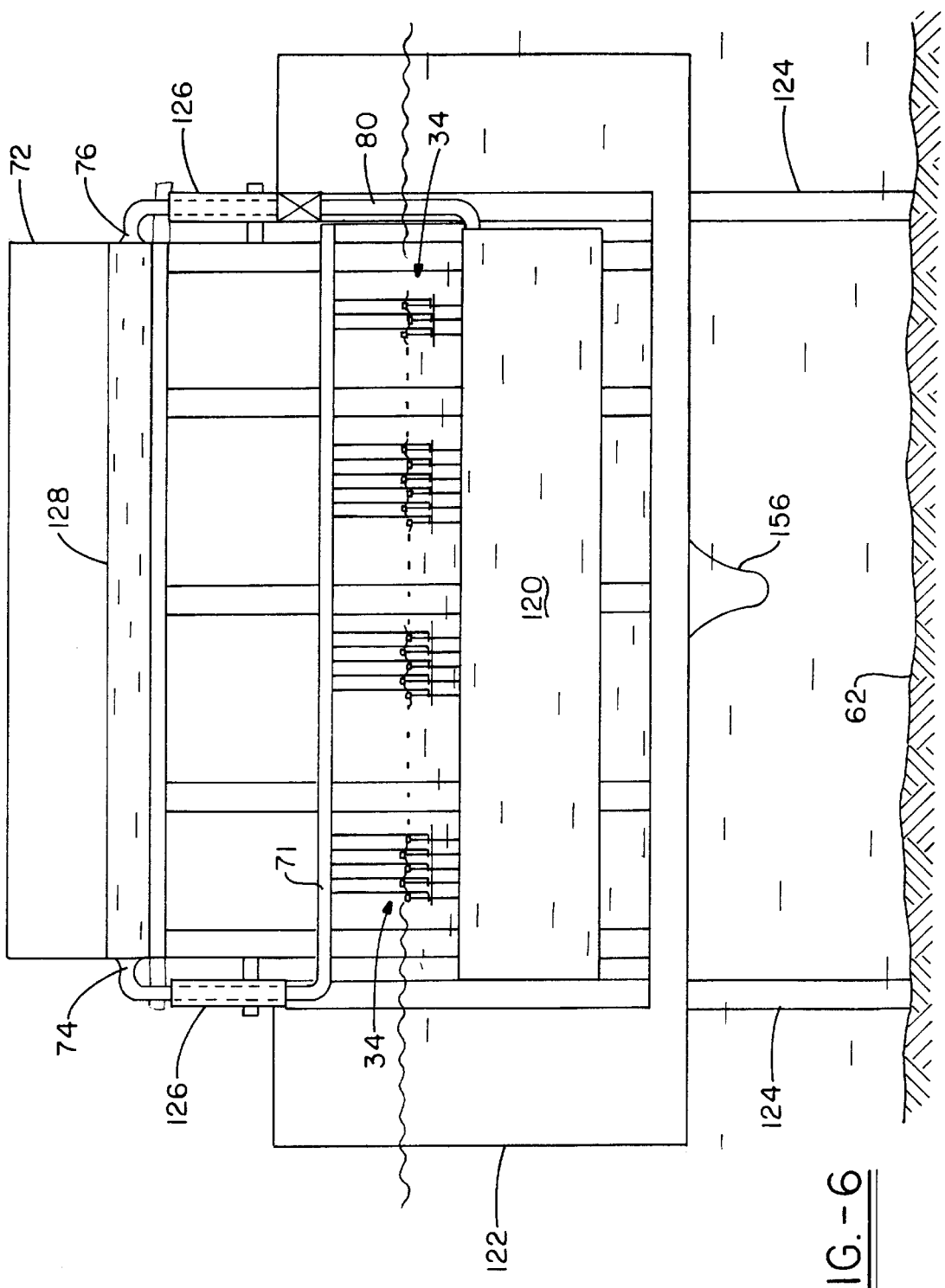
FIG. 6 schematically illustrates a constant head closed wave-action system in the empty position.
Figure 7:
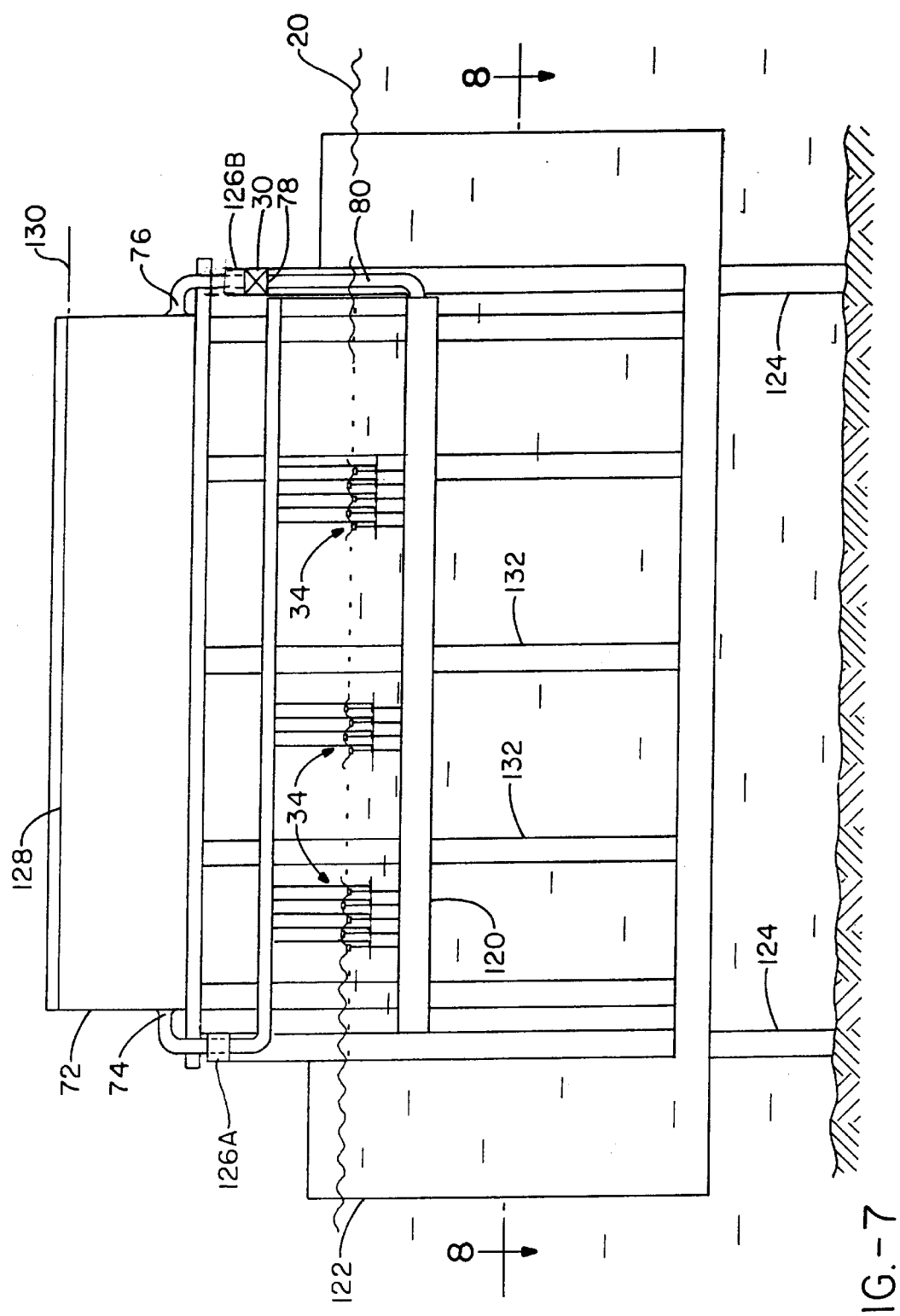
FIG. 7 schematically illustrates the constant head closed system of FIG. 6 but in the filled position.
Figure 8:
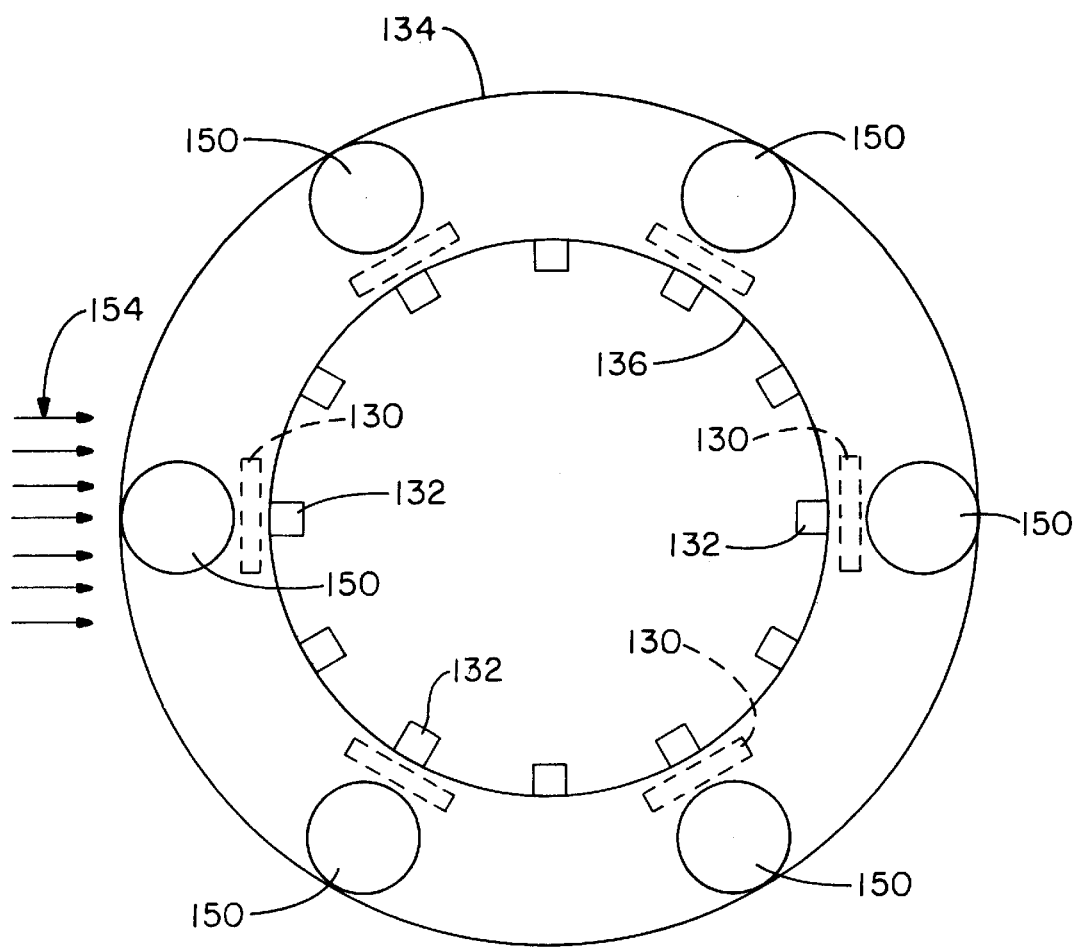
FIG. 8 schematically illustrates a plan view as may be taken at line 8—8 of FIG. 7.
Figure 9:
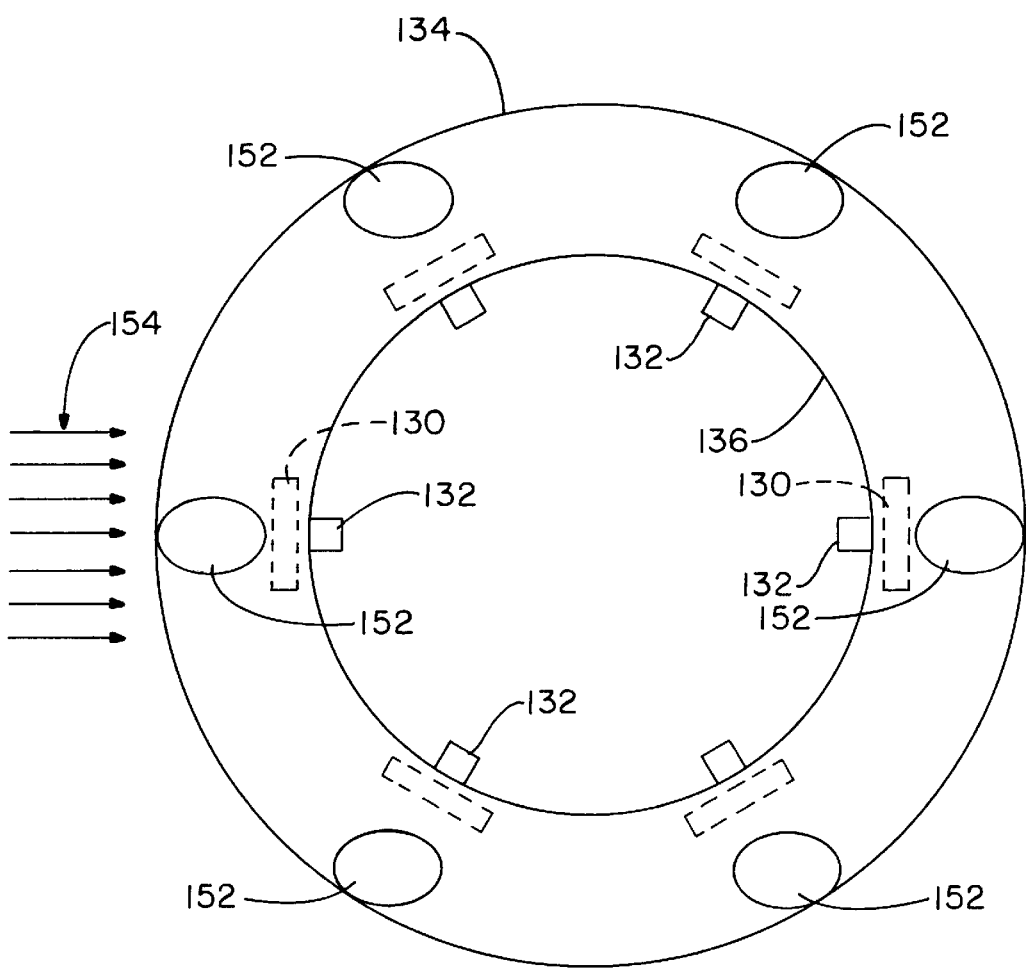
FIG. 9 schematically illustrates a plan view as may be taken at line 8—8 of FIG. 7.

With reference to FIGS. 6 and 7, closed system 90 can incorporate a variable volume tank 120 as its source to maintain a constant head characteristic, desirable from a power generation standpoint. In this embodiment, vessel 82 is a variable volume tank 120, and storage tank 72 is supported on floating structure 122. As best shown in FIGS. 6 and 7, fixed supports 124 support the hydro-electric generator 30 and restrict floating structure 122 to generally vertical motion. With particular reference to FIG. 8, the flotation tank can be provided with sleeves 130 that receive fixed supports 124. Sleeves 130 restrain floating structure 122 to generally vertical motion. Reservoir supports 132 extend from floating structure 122 to support storage tank 72. While shown as circular in cross-section, the floating structure's buoyant vertical members can be any shape and located inside or outside the supporting structure. In an alternative embodiment FIG. 9A, an annular oval shaped tanks 150 are used as the vertical members. The long axis 152 of the oval would be located parallel to the nominal wave propagation, represented by arrows 154, thus, reducing the member's interference with waves passing beneath the buoys. Preferably, floatation structure perimeter 134 extends beyond storage tank perimeter 136 (shown in dashed lines) to provide stability and maintain rebalancing forces. To provide further stability, a keel 156, FIG. 6, can be attached to the bottom of the floating structure 122.

The variable volume tank 120 floats in the ocean within floating structure 122 below wave action pump apparatus 10. The wave action pump apparatus 10 draws fluid 26 from the variable volume tank 120 and propels it to the storage tank 72. The storage tank 72 holds the fluid 26 until it is released via the tank outlet 76. Upon release, the fluid 26 drains through the hydroelectric generator 30 back to the variable volume tank 120. At least one expansion joint 126 is used in a constant head system 127. Preferably, a first expansion joint 126A is disposed between discharge 71 and the storage tank 72, and a second expansion joint 126B is disposed between the hydroelectric generator 30 and the storage tank discharge 76, respectively.

As best shown in FIG. 6, these joints 126 extend as the variable volume tank 82 takes on fluid, and retract, FIG. 7, as the fluid 26 is transferred or pumped from the variable volume tank 120 to storage tank 72. As fluid leaves the storage tank 72, the floating structure's buoyancy elevates storage tank 72, FIG. 6. As fluid is returned to storage tank 72 from wave action pump apparatus 10, the increased weight within storage tank 72 causes flotation structure 122 to at least partially submerse. Accordingly, the sinking of floating structure 122 decreases the storage tank's height above the nominal fluid surface and coincidentally its height above the fixed generator 30. Expansion joints 126 accommodate these changes. As the tank height increases or decreases the fluid level within the tank changes in reverse proportion. In this manner a top surface 128 of the fluid in the storage tank 72 is maintained at a constant height above the nominal ocean surface, as shown as a dashed line, and the generator 30 providing a constant head to drive hydro-electric turbine 30.

It can be appreciated that this system can be operated as an open system (not shown). In the open system, the storage tank would float on the floating structure located within a body of water. As fluid is pumped from the body of water to the storage tank the floating structure would sink. Thus, the top surface of the fluid inside the storage tank would remain at a constant height above the fixed generator.

A concern, to a greater extent in ocean based operations than other bodies of water, is the likelihood of toppling the plant 1. As can be appreciated, strong natural forces, including currents, tides, and winds act upon the plant 1. These forces may tip the structure causing the fluid levels in various tanks to shift towards the lower side of the structure. This shifting is amplified by the resultant change in buoyant forces within a submerged tank. To compensate for this shift, the fluid bearing tanks can be provided with baffles (not shown). For example, storage tank 72 and vessel 82 would have periodically spaced baffles formed within their structures. In circular tanks an exemplary spacing would be 15°, but as can be appreciated any spacing could be used. These baffles would not be sealed but would have small perforations allowing fluid to spread slowly. The perforation size would be restricted to prevent a rapid flush from a higher elevation, such as during a sudden tipping motion. Alternatively, a flexible vessel, such as variable volume tank 120, can compensate for shifting by deforming accordingly. Minimizing the sudden shift of fluids would reduce the torsional forces created by tipping, and, thus, reduce the chance of toppling the structure.

While only a preferred embodiment of my present invention is disclosed, it is to be clearly understood that the same is susceptible to numerous changes apparent to one skilled in the art. Therefore, the scope of the present invention is not to be limited to the details shown and described but is intended to include all changes and modifications which come within the scope of the appended claims.

As should now be apparent, the present invention not only teaches that a wave action hydroelectric plant embodying the concepts of the present invention is capable of capturing and transforming renewable wave energy into useable electrical power on a schedule to meet peak load periods, but also that the other objects of the invention can be likewise accomplished.

What is claimed is:

1. A wave action hydro-electric plant comprising:
    a plurality of wave action pumps, said pumps being in fluid communication with a storage tank and a submerged tank, said pumps drawing a fluid from said submerged tank and pumping said fluid to said storage tank; said storage tank having a tank inlet for receiving said fluid from said pumps and a tank outlet in selective fluid communication with a hydro-electric generator; said hydro-electric generator defining an exit; and
    a lid covering said storage tank, said lid defining a vent, wherein said vent is fluidly connected to said submerged tank by a vent line.

2. The wave action hydro-electric plant of claim 1, wherein said wave action pumps are attached to a flotation collar.

3. A wave action hydro-electric plant as in claim 1, wherein, said submerged tank is a variable volume tank.

4. A wave action hydro-electric plant comprising:
    a plurality of wave action pumps, said pumps being in fluid communication with a storage tank and a submerged tank, said pumps drawing a fluid from said submerged tank and pumping said fluid to said storage tank;
    said storage tank having a tank inlet for receiving said fluid from said pumps and a tank outlet in selective fluid communication with a hydro-electric generator; said hydro-electric generator defining an exit; wherein, said wave action pumps are divided into lower stage pumps and upper stage pumps, such that said lower stage pumps draw said fluid from said submerged tank and pump said fluid to an interstage surge line, and said upper stage pumps pump said fluid from said interstage surge line to said tank inlet.

5. A wave action hydro-electric plant comprising:
    a plurality of wave action pumps, said pumps being in fluid communication with a storage tank and a submerged tank, said pumps drawing a fluid from said submerged tank; and
    pumping said fluid to said storage tank;
    said storage tank having a tank inlet for receiving said fluid from said pumps and a tank outlet in selective fluid communication with a hydro-electric generator; said hydro-electric generator defining an exit; wherein said submerged tank extends laterally beyond a perimeter of said storage tank.

6. The wave action hydro-electric power plant as in claim 5, wherein the floating structure has a keel.

7. A method for converting renewable wave action energy to electrical energy comprising:
    using the motion of a wave to pump water from a source to a storage tank;
    supporting said storage tank above a body of water having a general wave direction on a floating structure having a plurality of support members; minimizing wave interference of the support structure by widely spacing said support members;
    storing the water in the storage tank until there is a demand for electric power; driving a hydro-electric generator by releasing the water from the storage tank at a height above the generator, wherein the generator produces an electric current.

8. The method for converting renewable wave action energy to electrical energy of claim 7, comprising the further step of reclaiming the fluid in a vessel after it exits the generator; and using said vessel as said source.

9. The method for converting renewable wave action energy to electrical energy of claim 8, wherein the vessel is a submerged tank.

10. The method for converting renewable wave action energy to electrical energy of claim 9, wherein said submerged tank is a variable volume vessel.

11. The method for converting renewable wave action energy to electrical energy of claim 7, wherein, the source is the body of water.

12. The method of claim 7 further comprising using support members having an oval cross-section; and aligning said oval support members, such that, a long axis of said oval support member runs parallel to the general wave direction.

13. A wave action hydro-electric plant comprising:
    a plurality of wave action pumps, said pumps being in fluid communication with a storage tank and a source, said pumps drawing a fluid from said source;

said storage tank having a tank inlet for receiving said fluid from said pumps and a tank outlet, in selective fluid communication with a hydro-electric generator; a floating structure supporting said storage tank, independently of said generator, allowing relative movement between said storage tank and said generator a first expansion joint disposed between said pump discharge and said inlet; and a second expansion joint between said storage tank and said generator.

14. The wave action hydro-electric power plant of claim 13, wherein said floating structure includes a submerged tank, wherein said submerged tank is said source.

15. A method for converting renewable wave action energy to electrical energy comprising:

using the motion of a wave to pump water from a source to a storage tank, wherein said source is a natural body of water, and said storage tank is supported above a surface of said natural body of water by a support structure having supporting members;

minimizing wave interference of said support structure by using supporting members having an oval cross-section;

aligning said oval support members such that along access of said support member runs parallel to wave motion on said natural body of water;

storing said water in said storage tank until there is a demand for electrical powers;

driving a hydro-electric generator by releasing said water from said storage tank at a height above said generator, whereby said generator produces an electric current.

16. A wave action hydro-electric plant comprising:

a wave action pump, said pump being in fluid communication with a storage tank and a variable volume source tank, said pump drawing a fluid from said source tank:

said storage tank having an outlet in communication with a hydro-electric generator, said hydro-electric generator defining an exit, wherein said exit is in fluid communication with said source tank.

17. The wave action hydro-electric plant of claim 16, wherein said variable volume tank is a flexible vessel.

18. A wave action hydro-electric plant comprising:

a plurality of wave action pumps in communication with a source and a storage tank, wherein said storage tank is within a body of fluid on a support structure, wherein said support structure has support members extending into said body of fluid, said fluid having a general wave direction, wherein said support members are oriented to reduce drag in said general wave direction; and a hydro-electric generator in fluid communication with said storage tank.

19. The wave action hydro-electric plant of claim 18, wherein said support members have a non-circular cross-section defining a long axis and a short axis, said long axis being aligned substantially parallel to said general wave direction.

20. The wave action hydro-electric plant of claim 19, wherein said non-circular cross-section is an oval.

* * * * *